United States Patent
Okazaki et al.

(10) Patent No.: US 6,600,244 B2
(45) Date of Patent: Jul. 29, 2003

(54) ELECTRIC MOTOR

(76) Inventors: Masafumi Okazaki, c/o Mitsubishi Denki Kabushiki Kaisha 2-3, Marunouchi 2-chome, Chiyoda-ku, Tokyo 100-8310 (JP); Yasuhide Yagyu, c/o Mitsubishi Denki Kabushiki Kaisha 2-3, Marunouchi 2-chome, Chiyoda-ku, Tokyo 100-8310 (JP); Hideki Megata, c/o Mitsubishi Denki Kabushiki Kaisha 2-3, Marunouchi 2-chome, Chiyoda-ku, Tokyo 100-8310 (JP); Takeshi Sugiyama, c/o Mitsubishi Denki Kabushiki Kaisha 2-3, Marunouchi 2-chome, Chiyoda-ku, Tokyo 100-8310 (JP); Yuji Nakahara, c/o Mitsubishi Denki Kabushiki Kaisha 2-3, Marunouchi 2-chome, Chiyoda-ku,Tokyo 100-8310 (JP); Akira Hashimoto, c/o Mitsubishi Denki Kabushiki Kaisha 2-3, Marunouchi 2-chome, Chiyoda-ku, Tokyo 100-8310 (JP)

(*) Notice: Subject to any disclaimer, the term of this patent is extended or adjusted under 35 U.S.C. 154(b) by 0 days.

(21) Appl. No.: 09/873,354

(22) Filed: Jun. 5, 2001

(65) Prior Publication Data

US 2002/0067094 A1 Jun. 6, 2002

(30) Foreign Application Priority Data

Dec. 5, 2000 (JP) ......................... 2000-370563

(51) Int. Cl.[7] .............................................. H02K 11/00
(52) U.S. Cl. ......................................... 310/71; 310/71
(58) Field of Search ........................ 310/71, 179, 260, 310/67 R, 254; H02K 11/00

(56) References Cited

U.S. PATENT DOCUMENTS 5,196,752 A * 3/1993 Palma ........................ 310/184
5,828,147 A * 10/1998 Best et al. ..................... 310/71
5,900,687 A * 5/1999 Kondo et al. ................ 310/260

FOREIGN PATENT DOCUMENTS

| JP | 6-233483 | * | 8/1994 |
| JP | 11-18345 | | 1/1999 |
| JP | 2000-224801 | * | 8/2000 |

OTHER PUBLICATIONS

Merriam Webster's Collegiate Dictionary, tenth edition, 1993, p. 105.*

* cited by examiner

Primary Examiner—Nestor Ramirez
Assistant Examiner—Dane Dinh Le

(57) ABSTRACT

A small-sized and inexpensive electric motor in which connection of a stator coil is easy, the connecting portion occupies a small space, and stable torque characteristics are obtained by making electric resistance uniform. A coil bobbin is mounted on a magnetic pole of a stator core, and a stator coil is fitted. A lead wire is led to an external diameter side of one end of the stator core. A connecting conductor holder with a common coil-connecting conductor, connecting conductors for each phase and a through hole is mounted on an end of a coil bobbin. The common coil-connecting conductor has connecting terminals projecting in radial directions, and the connecting conductors for each phase have such a cross-sectional area as to equalize electric resistance of each phase after connecting the stator coil. The through hole is formed to allow a bearing-housing portion to be inserted.

8 Claims, 7 Drawing Sheets

ELECTRIC MOTOR

BACKGROUND OF THE INVENTION

1. Technical Invention

The present invention relates to a small-sized electric motor which includes a connecting portion of a stator winding with less occupying space and equalized electric resistance in every phase, thereby facilitating a connection work and not producing non-uniformity in torque.

2. Background Art

A DC brushless motor has been increasingly applied to electronic equipment in recent years because of its simple construction and superior maintainability, being easy to construct in small size, and being easily driven by three phase AC power source controlled by power electronics, and the like. In combination with the recent progress in various apparatus and equipment of smaller size and lower price, the demand for the DC brushless motor is still increasing.

As one of the apparatus which copes with such demand, for example, the Japanese Patent Publication (unexamined) No. 18345/1999 discloses a stator for a electric motor (hereinafter referred to as DC brushless motor) in which stator windings are wound around a coil bobbin mounted on a stator core of the DC brushless motor, and each stator winding of same phase of the stator windings is connected through conductors. This known stator of the DC brushless motor comprises: an engaging groove provided on a flange of the mentioned coil bobbin for holding a starting end or a terminal end of the mentioned stator winding; a connection board formed into a disc of an insulating material, having a plurality of circular grooves on one end in radial direction, and provided with an insertion hole communicating to the mentioned groove on the other end; and a conductive member for each phase provided with a terminal segment having a U-shaped groove on the side of a belt-like conductor, the belt-like conductor being inserted in the groove of the mentioned connection board, and the terminal segment being projected from the mentioned insertion hole. As a result of such construction, it is reported that the connection between the stator winding of each phase and the conductive member for each phase is simplified, and the yield of materials is improved.

In such construction, a common conductive member of each phase is formed into a belt-shape with the same cross-sectional area as the conductive member for each phase and inserted in the groove of the mentioned connection board. The terminal segment thereof projects from the mentioned insertion hole in the same manner as the terminal segment of the conductive member for each phase. The terminal segment of the conductive member for each phase projects in the direction of external diameter of the mentioned connection board. On the other hand, the terminal segment of the common conductive member projects in the direction of internal diameter the mentioned connection board, and is connected to the stator winding of each phase.

In the stator of conventional DC brushless motor, however, as to the projecting direction of the terminal segment connected to the starting end or terminal end of the stator winding, a following point is to be noted. That is, the terminal segment of the conductive member for each phase projects in the direction of external diameter of the connection board, while the terminal segment of the common conductive member projects in the direction of internal diameter of the connection board. Therefore, a problem exists in that a space occupied by the connecting portion between each terminal segment and the starting end or terminal end of the stator winding is large over both internal and external diameter directions of the connection board. In particular, the connecting portion with the terminal segment of the common conductive member projecting in the internal diameter direction constitutes barrier that may be an obstacle in an attempt to shorten the DC brushless motor in axial direction. Another problem exists in that, at the time of connecting the terminal segment of the common conductive member to the starting end or terminal end of the stator winding, insertion of the tools for connection is not easy making it difficult to perform the connection work.

Moreover, the conductive members for each phase are formed of a material of the same cross-sectional area despite that they are formed with different diameters respectively. Therefore, a further problem exists in that there arises an irregularity in electric resistance value for each phase due to difference in length of the conductive members, etc., whereby non-uniformity in magnetic fluxes takes place in magnetic poles of each phase due to irregularity in current, eventually resulting occurrence of non-uniformity in torque.

Note that this type of DC brushless motor is usually used with a current in the range of approximately 50 to 100A under source voltage of 12 V, and impedance of each phase is originally small. Consequently, for example, in the case of using the DC brushless motor as a steering drive for vehicles, such occurrence of delicate non-uniformity in torque influenced by the irregularity of electric resistances of the conductive members for each phase undesirably gives a driver a feeling something like difficulty in adapting himself or herself to the manipulation and a sense of unease. As a result, a DC brushless motor without non-uniformity in torque has been heretofore desired for long.

SUMMARY OF THE INVENTION

The present invention was made to solve the above-discussed problems and has an object of providing a small-sized and inexpensive electric motor that facilitates connection of stator coil, capable of being constructed in small size, and provided with a connecting portion of the stator coil in which electric resistance is equalized and stable torque characteristic is obtained.

A electric motor according to the invention comprises:
- a plurality of stator coils wound around a magnetic pole of a stator core, and of which lead wires are led to an external diameter side in the vicinity of one end of the stator core;
- a connecting conductor holder being an insulating annular member having a through hole at the central part, in which a plurality of accommodating grooves opened to one side and formed in belt shape in circumferential direction are provided in diameter direction so as to be located in close proximity to the lead wires of the stator coils;
- first and second connecting conductors having a belt-like conductor accommodated in said accommodating grooves of said connecting conductor holder, and connecting terminals provided projecting from the mentioned belt-like conductor to the external diameter side of said connecting conductor holder and each connected to a predetermined lead wire of said stator coils;
- wherein the lead wires of the stator coils of same phase are connected to each other through the first connecting conductor, and the lead wires to be connected to an electrically neutral point of the stator coils are connected through the second connecting conductor.

As a result of such construction, it is possible to insert and operate the connecting tools easily, and to perform connection work easily, thereby achieving a connecting portion of high reliability.

It is also preferable that the connecting conductor holder has the through hole for forming a space in which a bearing-housing portion is inserted, the bearing-housing portion supporting a bearing of the electric motor arranged in the vicinity of the connecting conductor holder.

As a result, it is possible to insert and arrange the bearing-housing portion in the through hole, thereby reducing its length in axial direction, eventually resulting in a small sized electric motor. Furthermore, it is also possible to insert and arrange a coupling with other equipment driven in the electric motor in the like manner, making it possible to small size the whole apparatus including the driven equipment.

It is also preferable that the first connecting conductor has a sectional area to make electric resistance of each phase equal after connecting the lead wires of the stator coils.

As a result, no strong or weak magnetic flux due to uneven current arises, and it is possible to prevent occurrence of non-uniformity in torque.

It is also preferable that the first connecting conductor has an external terminal formed by bending an end part of the belt-like conductor toward a side where the connecting terminal is provided.

As a result, it is possible to achieve a first connecting conductor of good yield and inexpensive.

It is also preferable that the second connecting conductor serves as a connecting conductor plate comprising a conductor plate mounted on a side of the connecting conductor holder located on the opposite side of projecting connecting terminals of the first connecting conductor, and connecting terminals projecting from the conductor plate to the external diameter side of the connecting conductor holder.

As a result, distance between one connecting terminal and another of the first and the second connecting conductors becomes larger, and it is possible to perform the connection work more easily, thus achieving a connecting portion of high reliability.

It is also preferable that the connecting conductor plate is composed of conductor plate segments and a plurality of connecting conductor plates having connecting terminals provided projecting from the conductor plate segment.

As a result, it is possible to achieve a second connecting conductor of good yield and inexpensive.

BRIEF DESCRIPTION AND THE DRAWINGS

Figure 1:
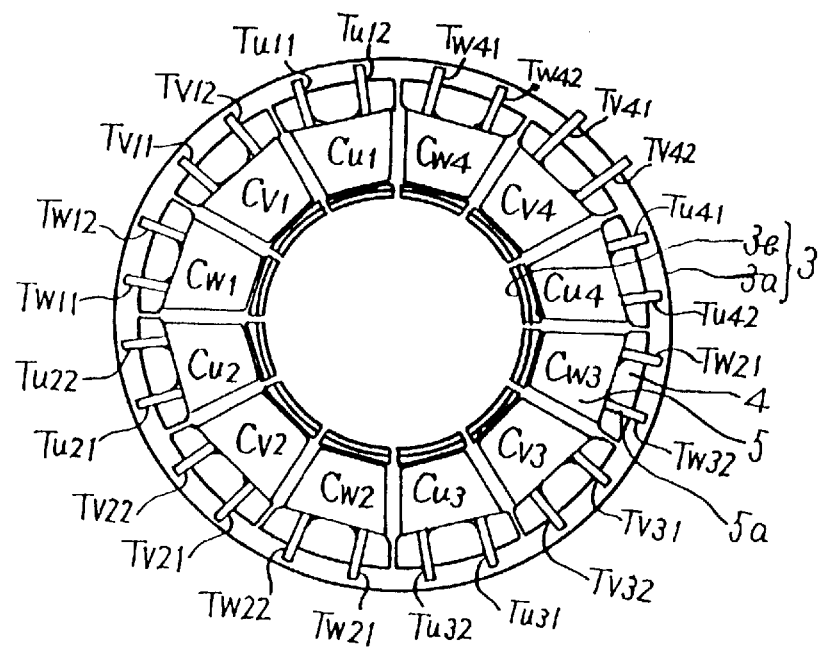
FIG. 1 is a front view showing a mounted condition of a stator coil according to Embodiment 1 of the present invention.

FIGS. 3(a), (b) and (c) are side views of a coil-connecting conductor for connecting the stator coil shown in FIG. 1. FIG. 3(a) is a side view of a common coil-connecting conductor for connecting common points, and FIG. 3(b) through FIG. 3(d) are side views of coil-connecting conductors for each phase for connection in order of W, V, and U phases respectively.

FIGS. 4(a) and (b) are developed views of the coil-connecting conductor shown in FIGS. 3(a), (b) and (c). FIG. 4(a) is a developed view of the common coil-connecting conductor, and FIG. 4(b) is a developed view of coil-connecting conductors for each of W, V, and U phases.

Figure 5:
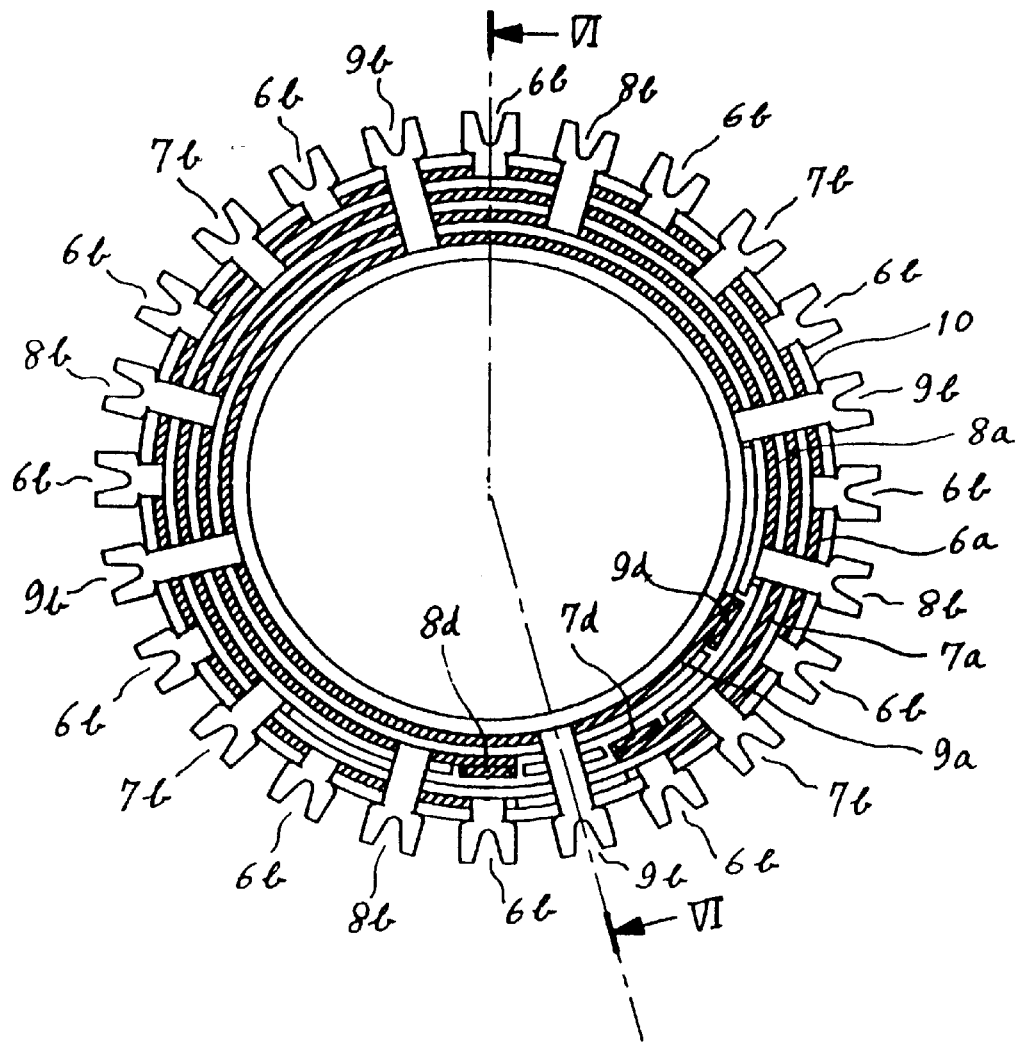

FIG. 5 is a view showing the coil-connecting conductors shown in FIGS. 3(a), (b) and (c) placed in a connecting conductor holder.

Figure 6:
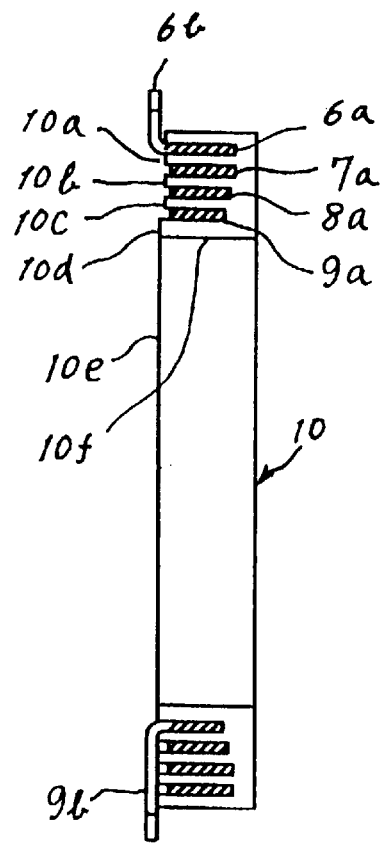

FIG. 6 is a sectional view taken along the line VI—VI in FIG. 5.

Figure 7:
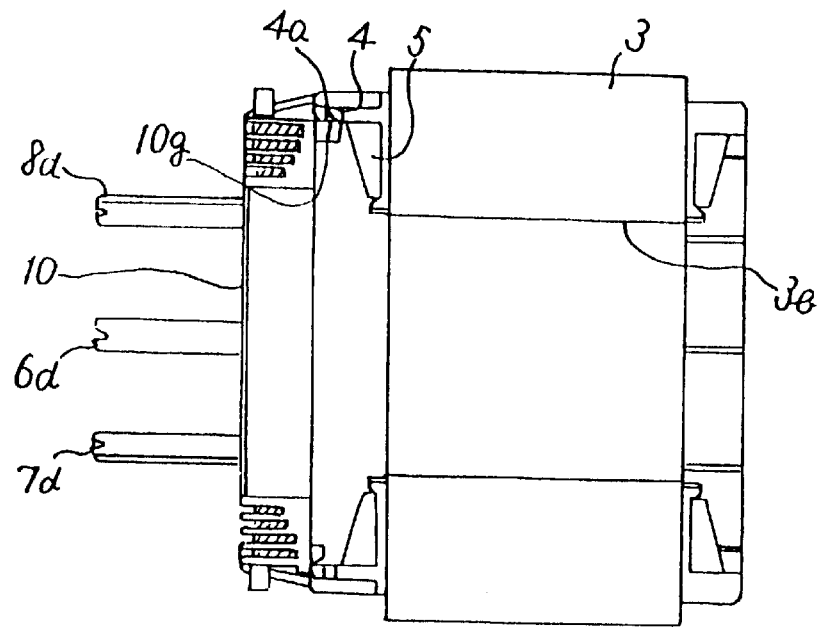

FIG. 7 is a sectional view showing a condition in which a connecting conductor holder for accommodating the coil-connecting conductors is fitted to a coil-bobbin thereby completing the connection of a stator coil according to Embodiment 1 of the invention.

Figure 8:
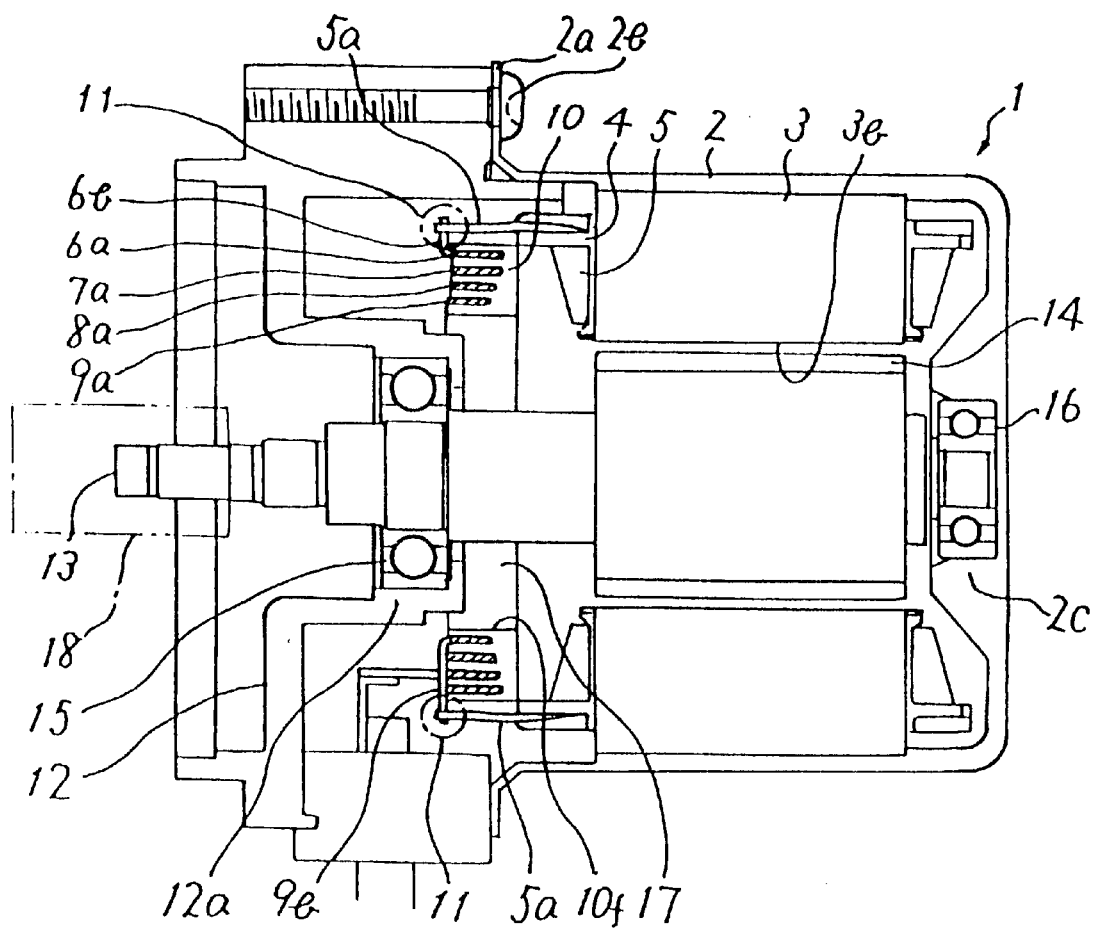

FIG. 8 is a sectional view of a DC brushless motor according to Embodiment 1 of the invention.

Figure 9:
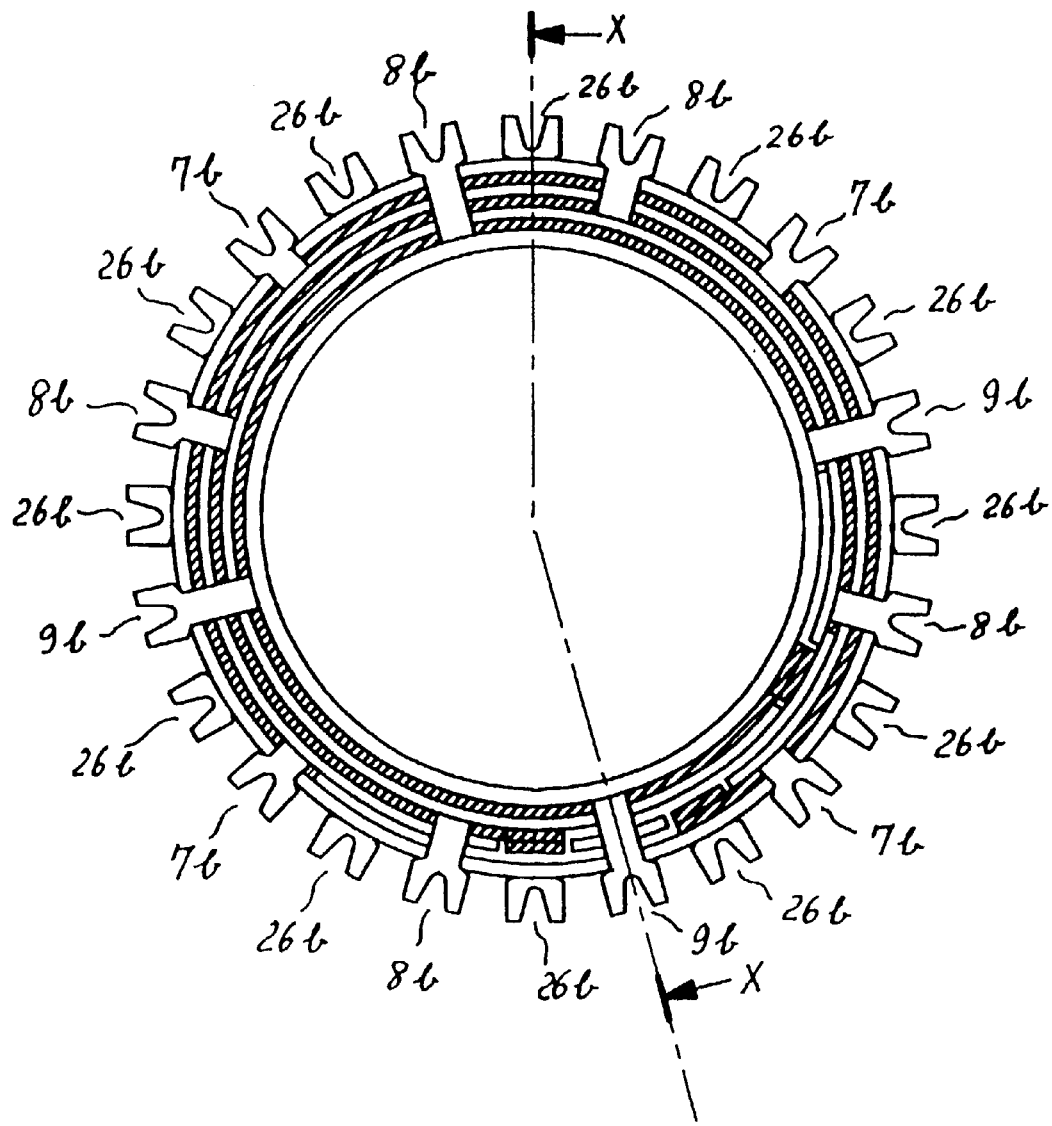

FIG. 9 is a view showing the coil-connecting conductors placed in a connecting conductor holder according to Embodiment 2 of the invention.

Figure 10:
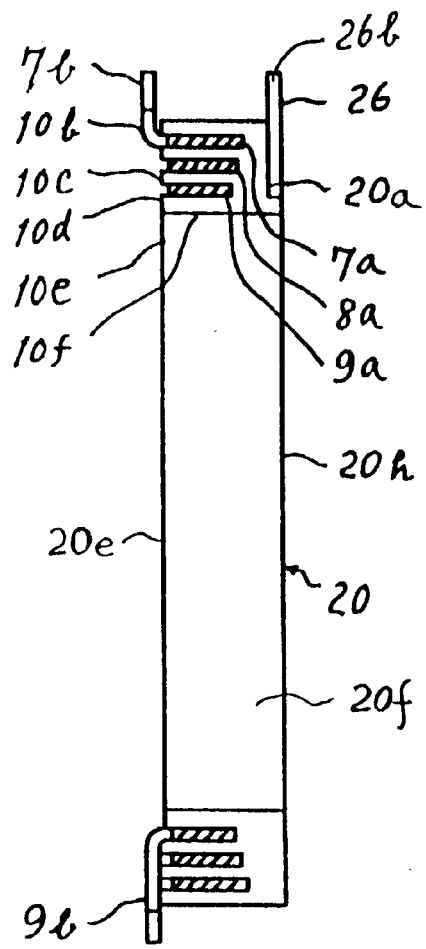

FIG. 10 is a sectional view taken along the direction X—X in FIG. 9.

Figure 11:
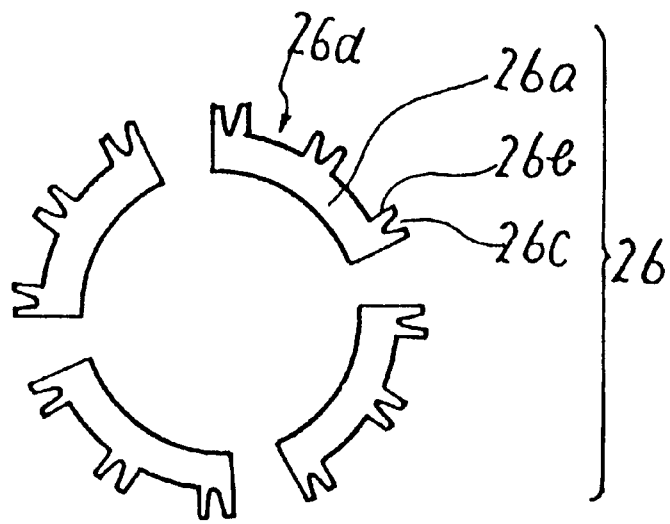

FIG. 11 is a plan view of common coil-connecting conductors according to Embodiment 2 of the invention.

DESCRIPTION OF THE PREFERRED EMBODIMENTS

Embodiment 1

An embodiment of the invention is hereinafter described with reference to the drawings. In FIG. 1, reference numeral 3 is a stator core comprised of a cylindrical core-back portion 3a formed by laminating silicon steel plates, and twelve magnetic poles 3b connected to the internal diameter side thereof. A coil-bobbin 4 formed by molding a insulating resin is mounted on the outer circumference of each magnetic pole 3b, and copper wires covered with insulating film are on concentratedly wound on the outer circumference thereof, thus a stator coil 5 being constructed. Cu1 through Cu4, Cv1 through Cv4, Cw1 through Cw4 indicate first through fourth stator coils of same phase as respective phases U, V, and W in the stator coils 5 respectively. Numeral 5a is a lead wire for the stator coil 5. Referring to the first stator coil of U phase, for example, a lead wire connected to the power source side is indicated by Tu11, and a lead wire connected to a common coil-connecting conductor (electrically neutral wire) is indicated by Tu12. Lead wires 5a for V phase and W phase are also indicated likewise.

Note that the core-back portion 3a is comprised of twelve core-pieces (not shown in the drawing) coupled at the rear part of the external diameter side, and provided with slits between one core-piece and another, and in which magnetic poles 3b are disposed side by side on respective core-pieces. In the arrangement of the stator coil 5 shown in FIG. 1, first the coil bobbin 4 is mounted on each magnetic pole 3b as it is stretched on a working bench. Then the copper wires covered with insulating film is concentratedly wound on the outer circumference thereof, thus the stator coil 5 being constructed. Subsequently the stator core 3 is constructed by bending annularly. When the annular stator cores 3 is formed by bending, both wall surfaces of each slit come in close contact with each other thereby forming the cylindrical core-back portion 3a. FIG. 1 shows such a condition.

Figure 2:
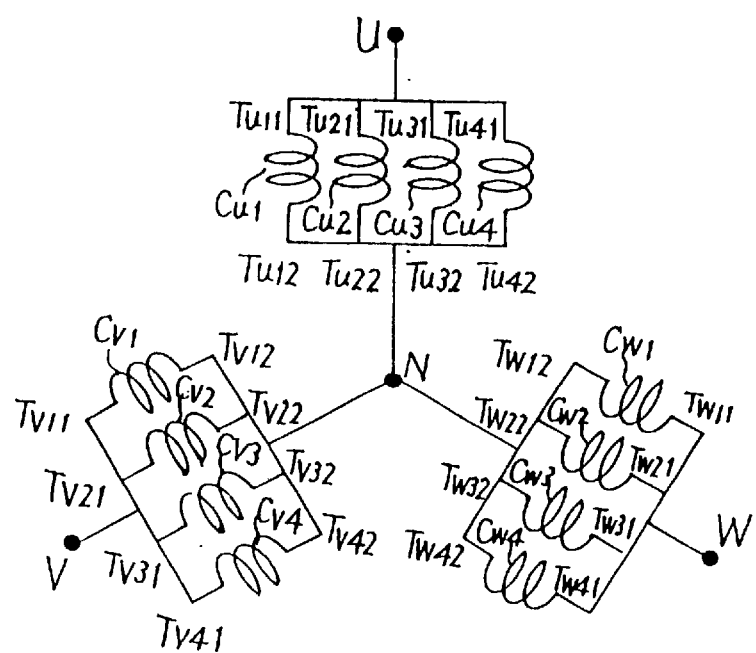
FIG. 2 is a connection diagram of the stator coil shown in FIG. 1.
Figure 3:
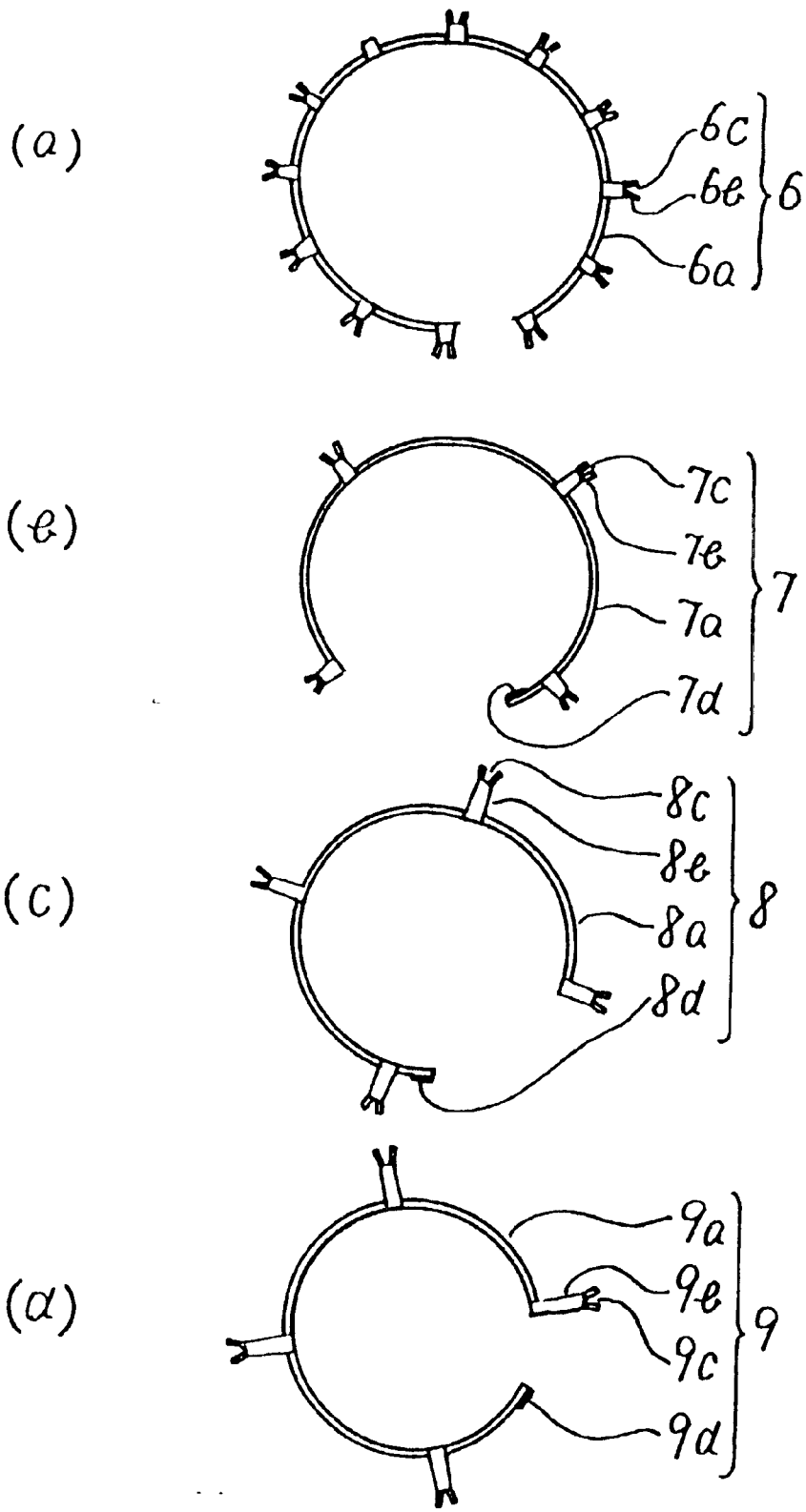

Each stator coil 5 arranged as described above is connected by means of each coil-connecting conductor shown in FIG. 3 in the manner of Y connection diagram in FIG. 2 (N is an electrically neutral point). In the drawings, numeral 6 is a common coil-connecting conductor serving as the second connecting conductor to form a connection line to the electrically neutral point N of the Y-connection. The common coil-connecting conductor 6 is comprised of a belt-like conductor 6a made of a copper plate, and twelve connecting terminals 6b. Those twelve connecting terminals 6b are provided on the belt-like conductor 6a at an equal pitch by being bent at a right angle to the external diameter direction, each having a U-shaped groove 6c opened at the top end portion. Numerals 7, 8 and 9 are coil-connecting conductors for each phase serving as the first connecting conductors for W, V and U phases respectively. The coil-connecting conductors 7, 8 and 9 for each phase are likewise comprised of belt-like conductors 7a, 8a and 9a made of copper plate respectively, and four connecting terminals 7b, 8b and 9b. Those four connecting terminals 7b, 8b and 9b are provided on the belt-like conductors 7a, 8a and 9a at an equal pitch by being bent at a right angle to the external diameter direction. The connecting terminals 7b, 8b and 9b have U-shaped grooves 7c, 8c and 9c opened at the top end portion and external terminals 7d, 8d and 9d, respectively.

Figure 4:
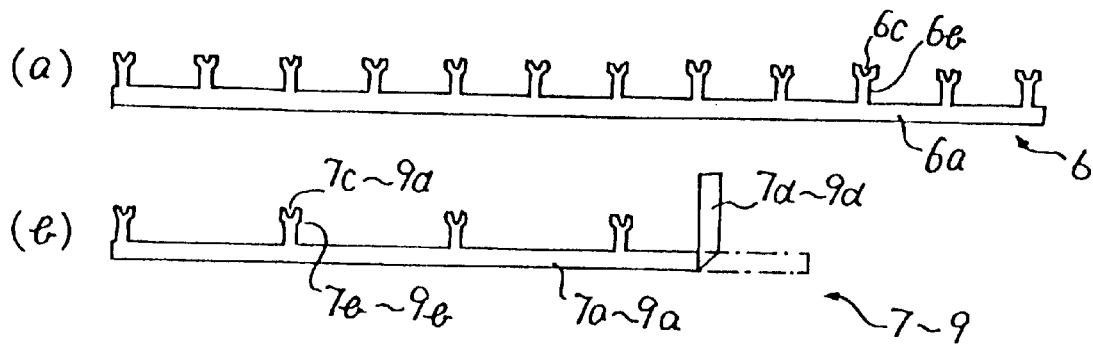

The common coil-connecting conductor 6 is formed by bending the belt-like plate shown in the developed view of the common coil-connecting conductor of FIG. 4(a), in such a manner as shown in FIG. 3(a). The coil-connecting conductors 7, 8 and 9 for each of W, V and U phases are formed by bending the belt-like plates shown in developed view of the coil-connecting conductors for each phase of FIG. 4(b), in such a manner as shown in FIG. 3(b) through FIG. 3(d). The same reference numerals as in FIG. 3. are designated to like parts in FIG. 4. Note that FIG. 4(b) illustrates only contour or configuration, and in terms of dimensions, each belt-like plate for W phase, V phase, U phase is different in length and width. In particular, it is one of the characteristic points of the invention that electric resistance values of the coil-connecting conductors for each phase 7, 8 and 9 are equalized by varying the width of each belt-like plate for W, V and U phase as described later.

In this respect, as shown in FIG. 4(b), the external terminals 7d, 8d and 9d of the coil-connecting conductors 7, 8 and 9 for each phase are formed by bending the end portion of the belt-like plates originally formed as indicated by the one-dot chain line at right angle in the direction in which the connecting terminals 7b, 8b and 9b are provided. This is because such bending process allows blanking to be performed with good yield resulting in an economical advantage. It is also possible that the belt-like plate as indicated by the solid line in FIG. 4(b) is originally prepared and subject to various workings without bending, but in this case the blanking yield is lower than that shown in the drawing.

In the common coil-connecting conductor 6 and the coil-connecting conductors 7, 8 and 9 for each phase of above construction, accommodating grooves 10a, 10b, 10c and 10d are provided in radial direction, as shown in FIGS. 5 and 6. The accommodating grooves 10a, 10b, 10c and 10d are formed into belt shape in circumferential direction and opened at one side 10e of an annular assembly. A through hole 10f is provided in the central part, and the coil-connecting conductors 7, 8 and 9 for each phase are placed and accommodated in each of the accommodating groove 10a, 10b, 10c and 10d of the connecting conductor holder 10 molded of an insulating resin material. More specifically, each connecting terminal 6b, 7b, 8b and 9b of the common coil-connecting conductor 6 and the coil-connecting conductors 7, 8 and 9 for each phase in this Embodiment 1 of the invention, are all provided to be projecting toward the external diameter side of the connecting conductor holder 10. Then, as shown in FIGS. 7 and 8, the connecting conductor holder 10 in such condition is secured onto the end of load side of the coil bobbin 4 by inserting a fixing claw 10g in an insertion hole 4a provided on the end of load side of the coil-bobbin 4 in close proximity to the lead wire 5a of the stator coil 5. Then, the lead wires 5a of each stator coil 5 are inserted in the U-shaped groves 6c, 7c, 8c and 9c of the connecting terminals 6b, 7b, 8b and 9b respectively, and then press-fitted/heated by known method to form a connecting portion 11 (see the connecting portion 11 in FIG. 8). FIG. 7 shows a condition in which the above described connection work has been completed.

As above described, in this Embodiment 1 of the invention, the connecting terminals 6b, 7b, 8b and 9b of the common coil-connecting conductor 6 and the coil-connecting conductors 7, 8 and 9 for each phase are all provided to be projecting toward the external diameter side of the connecting conductor holder 10. Therefore, it is possible to insert connecting tools and handle them easily, and thus the connection work is conducted easily. As a result, there is an advantage of obtaining a connecting portion of high reliability.

In the coil-connecting conductors 7, 8 and 9 for each of W, V and U phases, as shown in FIGS. 5 and 6, since the belt-like conductors 7a, 8a and 9a are molded to be different in diameter and also in length, in this Embodiment 1 of the invention, widths of the respective belted conductors 7a, 8a and 9a are reduced so as to decrease cross-sectional area thereof in order of reduction in diameter to be molded, thus making electric resistance for every phase uniform. However, to obtain the uniform electric resistance for every phase, the cross-sectional area may not be necessarily determined only from diameters to be molded, depending on length and configuration of the belt-like conductors 7a, 8a and 9a and the connecting terminals 7b, 8b and 9b. Therefore, it is necessary to determine cross-sectional areas of the connecting terminals 7b, 8b and 9b taking the mentioned specific conditions into account as a matter of course. As a result of such construction, electric resistance after connecting the W, V and U phases can be uniformed to prevent the DC brushless motor from occurrence of non-uniformity in torque.

Next, construction of the DC brushless motor according to Embodiment 1 of the invention is described with reference to FIG. 8.

The stator core 3 assembled as illustrated in FIG. 7, with the connection of the stator coil 5 having been completed, is then engaged with the inner circumference of a frame 2 and positioned there using a jig. Subsequently, a rotary shaft 13, mounted with a permanent magnet 14 arranged opposed to each magnetic pole 3b of the stator core 3, an anti-friction bearing 15 on load side and an anti-friction bearing 16 on anti-load side together, is inserted in the motor under the condition that a bearing-housing portion 12a for a bracket 12 is engaged with the outer circumference of the anti-friction bearing 15 on load side. Next, after completing the assembling so as to support the outer circumference of the anti-friction bearing 16 on anti-load side by a bearing-housing portion 2c of the frame 2 and support the outer circumference of the anti-friction bearing 15 on load side by a bearing-housing portion 12a of the bracket 12, the bracket 12 is securely fixed to a flange 2a provided on the end of load side of the frame 2 with a bolt 2b, thus a complete DC brushless motor 1 being obtained. Numeral 17 is a space formed between a wall surface of the through hole 10f of the connecting conductor holder 10 and the external diameter of the rotary shaft 13, numeral 18 is a coupling fitted on the end of the shaft on the load side of the rotary shaft 13.

In this Embodiment 1 of the invention, as illustrated in FIG. 5, each of the connecting terminals 6b, 7b, 8b and 9b of the common coil-connecting conductor 6 and the coil-connecting conductors 7, 8 and 9 for each phase of the stator coils 5 are arranged together projecting toward the external diameter of the connecting conductor holder 10, and thus forming the connecting portion 11 with the lead wire 5a of the stator coils 5. Therefore the free space 17 is formed between the wall surface of the through hole 10f of the connecting conductor holder 10 and the external diameter of the rotary shaft 13. Consequently, s desired arrangement is obtained by inserting the anti-friction bearing 15 on load side and the bearing-housing portion 12a of the bracket 12 in the space 17. It is possible to reduce, by that portion, the length in axial direction of the DC brushless motor 1, and it is further possible to insert, by that portion, a mounting position of the coupling 18 fitted to the end of load side of the rotary shaft into the DC brushless motor 1. Therefore, there arises an advantage of making the entire equipment including not only the DC brushless motor 1 but also other equipment driven by the motor small-sized.

Embodiment 2

In FIGS. 9 to 11, numeral 20 is a connecting conductor holder molded annularly of an insulating resin material. The connecting conductor holder 20 comprises belt-like accommodating grooves 10b, 10c and 10d formed in circumferential direction and opened on one side 20e; belt-like stepped face portion 20a provided at four locations (not shown) at equal pitch on the other side 20h, the belt like stepped face portion 20a having a plane stepped down from the other side 20h and formed belt-like in circumferential direction and opened on outer circumference side; and a through hole 20f opened in the central part. As illustrated in FIG. 9, the coil-connecting conductors 7, 8 and 9 for each of W, V and U phases are accommodated in the accommodating grooves 10b, 10c and 10d respectively.

Numeral 26 is a common coil-connecting conductor, serving as a second connecting conductor for forming a connection line to the electrically neutral point of Y-connection. As illustrated in FIG. 11, the common coil-connecting conductor 26 is a connecting conductor plate formed by four sets of common coil-connecting conductor segments 26d. Each of the common coil-connecting conductor segments 26d is comprised of a circular conductor plate segment 26a of copper plate, and three connecting terminals 26b provided at equal pitch on the outer circumference each with U-shaped grooves 26c at the top end portion. The common coil-connecting conductor segments 26d, in the arrangement as illustrated in FIG. 11, are fitted on each face of the belt-like stepped face portion 20a of the connecting conductor holder 20 using, for example, an adhesive. Note that the belt-like stepped face portion 20a is formed in such a size as to be easily positioned and fitted conforming to the configuration of each common coil-connecting conductor segment 26d. The foregoing construction of the common coil-connecting conductor 26 makes it possible to manufacture a motor of good yield at lower cost. In order to simplify the configuration of the connecting conductor holder 20, it is also preferable that each of the common coil-connecting conductor segments 26d is fitted directly to the side face 20h of the connecting conductor holder 20 without providing the belt-like stepped face portion 20a. It is also preferable that the configuration of the conductor plate segments 26a is polygonal. It is also preferable that the construction is simplified by coupling together the four sets of the common coil-connecting conductor segments 26d thereby forming a circular or ring-shaped integral unit of the connecting conductor plates.

In the foregoing common coil-connecting conductor 26 according to this Embodiment 2 of the invention, the connecting terminals 26b are arranged as illustrated in FIG. 9. The connecting terminals 7b, 8b and 9b of the coil-connecting conductors 7, 8 and 9 for each phase are apart from the connecting terminal 26d of the common coil-connecting conductor 26 by a horizontal distance substantially corresponding to plate thickness of the connecting conductor holder 20. As a result, actual distance between one connecting terminal and another becomes much larger, and it is possible to conduct more easily the connection work with lead wires 5a of the stator coils 5. Thus, there arises an advantage of obtaining a connecting portion of high reliability.

In addition, in the forgoing Embodiments 1 and 2, although the motor to which the invention is applied, is described as a DC brushless motor, it is to be understood that the invention is not limited thereto, but the invention can be applied to stepping motors, power generators or any other electric motors as far as they are of the same construction.

What is claimed is:

1. An electric motor comprising:
 a plurality of stator coils wound around a magnetic pole of a stator core, and of which lead wires are led to an external diameter side in the vicinity of one end of the stator core;
 a connecting conductor holder being an insulating annular member having a through hole at the central part, in which a plurality of accommodating grooves opened to one side and formed in belt shape in circumferential direction are provided in diameter direction so as to be located in close proximity to the lead wires of said stator coils;
 a first connecting conductor and a second connecting conductor each comprising a belt-like conductor accommodated in said accommodating grooves of said connecting conductor holder, and connecting terminals provided projecting from said belt-like conductor to the external diameter side of said connecting conductor holder and each connected to a predetermined lead wire of said stator coils;
 wherein the lead wires of said stator coils of same phase are connected to each other through said first connecting conductor, and the lead wires to be connected to an electrically neutral point of said stator coils are connected through said second connecting conductor; and
 a plurality of said first connecting conductors are provided, each having a cross-sectional area sized to make electric resistance of each phase equal after connecting the lead wires of said stator coils.

2. The electric motor according to claim 1, wherein the connecting conductor holder has the through hole for forming a space in which a bearing-housing portion is inserted, said bearing-housing portion supporting a bearing of the electric motor arranged in the vicinity of said connecting conductor holder.

3. The electric motor according to claims 1, wherein the first connecting conductor has an external terminal formed by bending an end part of the belt-like conductor toward a side where the connecting terminal is provided.

4. An electric motor comprising:
 a plurality of stator coils wound around a magnetic pole of a stator core, and of which lead wires are led to an external diameter side in the vicinity of one end of the stator core;
 a connecting conductor holder being an insulating annular member having a through hole at the central part, in which a plurality of accommodating grooves opened to one side and formed in belt shape in circumferential direction are provided in diameter direction so as to be located in close proximity to the lead wires of said stator coils;

first connecting conductors having a belt-like conductor accommodated in said accommodating grooves of said connecting conductor holder, and connecting terminals provided projecting from the mentioned belt-like conductor to the external diameter side of said connecting conductor holder and each connected to a predetermined lead wire of said stator coils;

second connecting conductor having a conductor plate mounted on a side of the connecting conductor holder opposite said plurality of accommodating grooves, and connecting terminals projecting from the conductor plate to the external diameter side of said connecting conductor holder and each connected to a predetermined lead wire of said stator coils;

wherein the lead wires of said stator coils of same phase are connected to each other through said first connecting conductor, and the lead wires to be connected to an electrically neutral point of said stator coils are connected through said second connecting conductor.

5. The electric motor according to claim 4, wherein the second connecting conductor plate is composed of a plurality of connecting conductor plates having conductor plate segments and connecting terminals provided projecting from said conductor plate segment.

6. The electric motor according to claim 4, wherein said first connecting conductors have a rectangular cross-section.

7. The electric motor according to claim 6, wherein said rectangular cross-section of each of said first connecting conductors is varied in width to make electric resistance of said each of said first connecting conductors equal after connecting the lead wires of said stator coils.

8. An electric motor comprising:

a plurality of stator coils wound around a magnetic pole of a stator core, and of which lead wires are led to an external diameter side in the vicinity of one end of the stator core;

a connecting conductor holder being an insulating annular member having a through hole at the central part, in which a plurality of accommodating grooves opened to one side and formed in belt shape in circumferential direction are provided in diameter direction so as to be located in close proximity to the lead wires of said stator coils;

a first connecting conductor and a second connecting conductor each comprising a belt-like conductor accommodated in said accommodating grooves of said connecting conductor holder, and connecting terminals provided projecting from said belt-like conductor to the external diameter side of said connecting conductor holder and each connected to a predetermined lead wire of said stator coils;

wherein the lead wires of said stator coils of same phase are connected to each other through said first connecting conductor, and the lead wires to be connected to an electrically neutral point of said stator coils are connected through said second connecting conductor;

said first connecting conductor has a rectangular cross-section; and a plurality of said first connection conductors are provided, and said rectangular-cross section of each one of said plurality of said first connecting conductors is varied in width to make electric resistance of each one of said plurality of said first connecting conductors equal after connecting the lead wires of said stator coils.

* * * * *